United States Patent
Golander

(10) Patent No.: US 10,031,933 B2
(45) Date of Patent: Jul. 24, 2018

(54) PEER TO PEER OWNERSHIP NEGOTIATION

(71) Applicant: NETAPP, INC., Sunnyvale, CA (US)

(72) Inventor: Amit Golander, Tel-Aviv (IL)

(73) Assignee: NETAPP, INC., Sunnyvale, CA (US)

( * ) Notice: Subject to any disclaimer, the term of this patent is extended or adjusted under 35 U.S.C. 154(b) by 152 days.

(21) Appl. No.: 14/635,236

(22) Filed: Mar. 2, 2015

(65) Prior Publication Data

US 2015/0249618 A1    Sep. 3, 2015

Related U.S. Application Data

(60) Provisional application No. 61/946,847, filed on Mar. 2, 2014.

(51) Int. Cl.
| | | |
|---|---|---|
| G06F 17/30 | (2006.01) | |
| H04L 29/08 | (2006.01) | |
| H04L 12/911 | (2013.01) | |

(52) U.S. Cl.
CPC .. *G06F 17/30312* (2013.01); *G06F 17/30194* (2013.01); *G06F 17/30221* (2013.01); *G06F 17/30477* (2013.01); *H04L 47/70* (2013.01); *H04L 67/104* (2013.01); *H04L 67/1097* (2013.01)

(58) Field of Classification Search
CPC ................................................ G06F 17/30312
USPC ........................................................ 709/224
See application file for complete search history.

(56) References Cited

U.S. PATENT DOCUMENTS

| | | | | |
|---|---|---|---|---|
| 5,050,213 A | * | 9/1991 | Shear .................. | G06F 12/1408 705/53 |
| 5,864,854 A | | 1/1999 | Boyle | |
| 5,982,747 A | * | 11/1999 | Ramfelt .............. | H04L 12/2852 370/224 |
| 6,101,420 A | * | 8/2000 | VanDoren .......... | G05B 19/0421 200/2 |
| 6,360,331 B2 | * | 3/2002 | Vert ..................... | G06F 11/1662 709/239 |

(Continued)

OTHER PUBLICATIONS

Microsoft Computer Dictionary, "distributed file system", p. 168, 2002.*

(Continued)

*Primary Examiner* — O. C. Vostal
(74) *Attorney, Agent, or Firm* — Klein, O'Neill & Singh, LLP

(57) ABSTRACT

A method of negotiating memory record ownership between network nodes, comprising: storing in a memory of a first network node a subset of a plurality of memory records and one of a plurality of file system segments of a file system mapping the memory records; receiving a request from a second network node to access a memory record of the memory records subset; identifying the memory record by using the file system segment; deciding, by a placement algorithm, whether to relocate the memory record, from the memory records subset to a second subset of the plurality of memory records stored in a memory of the second network node; when a relocation is not decided, providing remote access of the memory record via a network to the second network node; and when a relocation is decided, relocating the memory record via the network for management by the second network node.

20 Claims, 3 Drawing Sheets

(56) References Cited

U.S. PATENT DOCUMENTS

| | | | | |
|---|---|---|---|---|
| 6,374,332 B1* | 4/2002 | Mackenthun | G06F 12/0828 | 711/145 |
| 6,453,354 B1* | 9/2002 | Jiang | G06F 17/30171 | 707/E17.01 |
| 6,691,178 B1* | 2/2004 | Kasper | G06F 13/28 | 709/213 |
| 6,697,846 B1* | 2/2004 | Soltis | G06F 17/30194 | 707/999.001 |
| 7,120,631 B1* | 10/2006 | Vahalia | G06F 17/30171 | |
| 7,155,722 B1* | 12/2006 | Hilla | G06F 9/505 | 709/223 |
| 7,613,947 B1* | 11/2009 | Coatney | G06F 11/0727 | 714/6.1 |
| 7,711,683 B1* | 5/2010 | Watanabe | G06F 17/30082 | 707/704 |
| 7,873,619 B1* | 1/2011 | Faibish | G06F 17/30091 | 707/705 |
| 7,937,377 B2* | 5/2011 | Wilding | G06F 17/30362 | 707/704 |
| 8,041,735 B1* | 10/2011 | Lacapra | G06F 17/30194 | 707/783 |
| 8,219,712 B2* | 7/2012 | Riddoch | G06F 13/4221 | 707/600 |
| 8,250,586 B2* | 8/2012 | Nelson | G06F 9/45533 | 711/148 |
| 8,972,345 B1* | 3/2015 | Aguilera | G06F 17/30194 | 707/615 |
| 9,037,698 B1* | 5/2015 | Nordstrom | G06F 11/301 | 707/736 |
| 9,084,105 B2* | 7/2015 | Luna | H04W 8/24 | |
| 9,292,620 B1 | 3/2016 | Hoover et al. | | |
| 2002/0046232 A1* | 4/2002 | Adams | G06F 17/30206 | 709/200 |
| 2003/0041173 A1* | 2/2003 | Hoyle | G06F 9/526 | 709/248 |
| 2003/0177218 A1* | 9/2003 | Poirot | H04L 43/0817 | 709/223 |
| 2004/0064523 A1 | 4/2004 | Zhang et al. | | |
| 2004/0111486 A1* | 6/2004 | Schuh | G06F 17/30902 | 709/214 |
| 2004/0153866 A1* | 8/2004 | Guimbellot | H04L 1/22 | 714/4.11 |
| 2007/0094269 A1 | 4/2007 | Mikesell et al. | | |
| 2007/0239695 A1* | 10/2007 | Chakra | G06F 17/30165 | |
| 2008/0168304 A1* | 7/2008 | Flynn | G06F 1/183 | 714/6.12 |
| 2010/0020718 A1* | 1/2010 | Tabbara | G06Q 30/06 | 370/254 |
| 2010/0074264 A1* | 3/2010 | Davis | G06F 11/0709 | 370/401 |
| 2010/0238194 A1* | 9/2010 | Roach, Jr. | H04M 3/42 | 345/629 |
| 2010/0262717 A1* | 10/2010 | Critchley | H04L 12/42 | 709/251 |
| 2010/0274772 A1* | 10/2010 | Samuels | G06F 17/30156 | 707/693 |
| 2010/0281220 A1* | 11/2010 | Cantin | G06F 12/084 | 711/130 |
| 2010/0332285 A1* | 12/2010 | Dunagan | G06Q 10/06 | 705/7.37 |
| 2011/0314238 A1* | 12/2011 | Finkler | G06F 9/544 | 711/162 |
| 2012/0110110 A1* | 5/2012 | Luna | H04L 67/22 | 709/213 |
| 2012/0203733 A1* | 8/2012 | Zhang | G06Q 50/01 | 707/600 |
| 2012/0311603 A1* | 12/2012 | Kudo | G06F 3/0611 | 718/105 |
| 2013/0013931 A1* | 1/2013 | O'Hare | G06F 21/62 | 713/189 |
| 2013/0198459 A1* | 8/2013 | Joshi | G06F 12/084 | 711/130 |
| 2013/0246619 A1* | 9/2013 | Raja | H04L 67/325 | 709/224 |
| 2014/0007189 A1* | 1/2014 | Huynh | G06F 3/0622 | 726/3 |
| 2014/0013059 A1* | 1/2014 | Joshi | G06F 12/0815 | 711/144 |
| 2014/0115579 A1* | 4/2014 | Kong | G06F 3/0605 | 718/1 |
| 2014/0123307 A1* | 5/2014 | Jung | H04L 41/5054 | 726/27 |
| 2014/0149783 A1* | 5/2014 | Georgiev | G06F 11/0793 | 714/4.2 |
| 2014/0177470 A1* | 6/2014 | Roitshtein | H04L 41/083 | 370/254 |
| 2015/0149416 A1* | 5/2015 | Dhavale | G06F 17/30348 | 707/687 |
| 2015/0248443 A1 | 9/2015 | Golander | | |

OTHER PUBLICATIONS

Stalker Software, "Cluster Technology and File Systems", 2001-2004.*

Sun Microsystems, "NFS: Netwrok File System Protocol Specification", RFC 1094, 1989.*

Non-Final Office Action on co-pending U.S. Appl. No. 14/635,261, dated Jul. 27, 2017.

Final Office Action on co-pending U.S. Appl. No. 14/635,261, dated Jan. 24, 2018.

* cited by examiner

PEER TO PEER OWNERSHIP NEGOTIATION

RELATED APPLICATION

This application claims the benefit of priority under 35 USC 119(e) of U.S. Provisional Patent Application No. 61/946,847 filed on Mar. 2, 2014, the contents of which are incorporated herein by reference in their entirety.

FIELD AND BACKGROUND OF THE INVENTION

The present invention, in some embodiments thereof, relates to a shared file system and, more particularly, but not exclusively, to negotiating ownership of a memory record in a shared file system.

Direct-attached storage (DAS) is a model in which data is local on a server and benefits from low latency access. However, when multiple servers are connected to a network, the DAS model is: inefficient, because there is no resource sharing between servers; inconvenient since data cannot be shared between processes running on different application servers; and not resilient because data is lost upon a single server failure.

To overcome the weaknesses of DAS, shared storage model was invented. Shared-storage systems store all or most metadata and data on a server, which is typically an over-the-network server and not the same server that runs the application/s that generates and consumes the stored data. This architecture can be seen both in traditional shared storage systems, such as NetApp FAS and/or EMC Isilon, where all of the data is accessed via the network; and/or in host-based storage, such as Redhat Gluster and/or EMC Scale-io, in which application servers also run storage functions, but the data is uniformly distributed across the cluster of servers (so 1/n of the data is accessed locally by each server and the remaining (n-1)/n of the data is accessed via the network).

Another well known variant of shared storage is shared storage with (typically read) caches. In this design the application server includes local storage media (such as a Flash card) that holds data that was recently accessed by the application server. This is typically beneficial for recurring read requests. Caching can be used in front of a traditional shared storage (for example in Linux block layer cache (BCache)), or in front of a host-based storage (for example in VMware vSAN). These caching solutions tend to be block-based solutions—i.e. DAS file system layer on top of a shared block layer.

Finally, some storage protocols such as Hadoop distributed file system (HDFS) and parallel network file system (pNFS), allow for metadata to be served from a centralized shared node, while data is served from multiple nodes. The data (not metadata) is typically uniformly distributed among the nodes for load balancing purposes.

SUMMARY OF THE INVENTION

According to an aspect of some embodiments of the present invention there is provided a method of negotiating memory record ownership between network nodes, comprising: storing in a memory of a first network node a subset of a plurality of memory records and one of a plurality of file system segments of a file system mapping the plurality of memory records; receiving a request from a second network node to access a memory record of the memory records subset; identifying the memory record by using the file system segment; deciding, by a placement algorithm, whether to relocate the memory record, from the memory records subset to a second subset of the plurality of memory records stored in a memory of the second network node; when a relocation is not decided, providing remote access of the memory record via a network to the second network node; and when a relocation is decided, relocating the memory record via the network for management by the second network node.

Optionally, the deciding is done according to an open action for the memory record by the second network node.

Optionally, the deciding is done according to use of the memory record by other network nodes.

Optionally, the deciding is done according to traffic load on the network based on connections to the network node.

Optionally, the method further comprises: monitoring previous relocations of the memory record between network nodes in previous ownership negotiation processes; wherein the deciding is done according to the monitoring.

Optionally, the providing remote access includes retrieving the memory records from a third party shared storage to the first network node.

Optionally, the relocating includes retrieving the memory records from a third party shared storage to the second network node.

Optionally, the method further comprises: when receiving requests from multiple network nodes for read only access to the memory record, creating cached copies of the memory record in storage units of the multiple network nodes to decrease network load.

More optionally, the method further comprises: when the memory record is updated, invalidating the cached copies of the memory record.

Optionally, the relocation is delayed due to lack of vacant capacity on a memory of the second network node as indicated by the second network node.

Optionally, the relocation is delayed due to network traffic load on the network based on connections to the network node.

Optionally, the relocation is done by prioritizing relocation of data units of the memory record that are requested by the second network node.

Optionally, the method further comprises: relocating a memory record of a directory containing the memory record.

According to some embodiments of the invention there is provided a computer readable medium comprising computer executable instructions adapted to perform the method.

According to an aspect of some embodiments of the present invention there is provided a system of negotiating memory record ownership between network nodes, comprising: a memory of a first network node that stores a subset of a plurality of memory records and one of a plurality of file system segments of a file system mapping the plurality of memory records; and a program store storing a storage managing code; and a processor, coupled to the program store, for implementing the storage managing code, the storage managing code comprising: code to receive a request from a second network node to access a memory record of the memory records subset; code to identify the memory record by the file system segment; code to decide, by a placement algorithm, whether to relocate of the memory record, from the memory records subset to a second subset of the plurality of memory records stored in a memory of the second network node; when a relocation is not decided, relocate remote access of the memory record via a network to the second network node; and when a relocation is decided, relocate the memory record via the network to the second network node.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
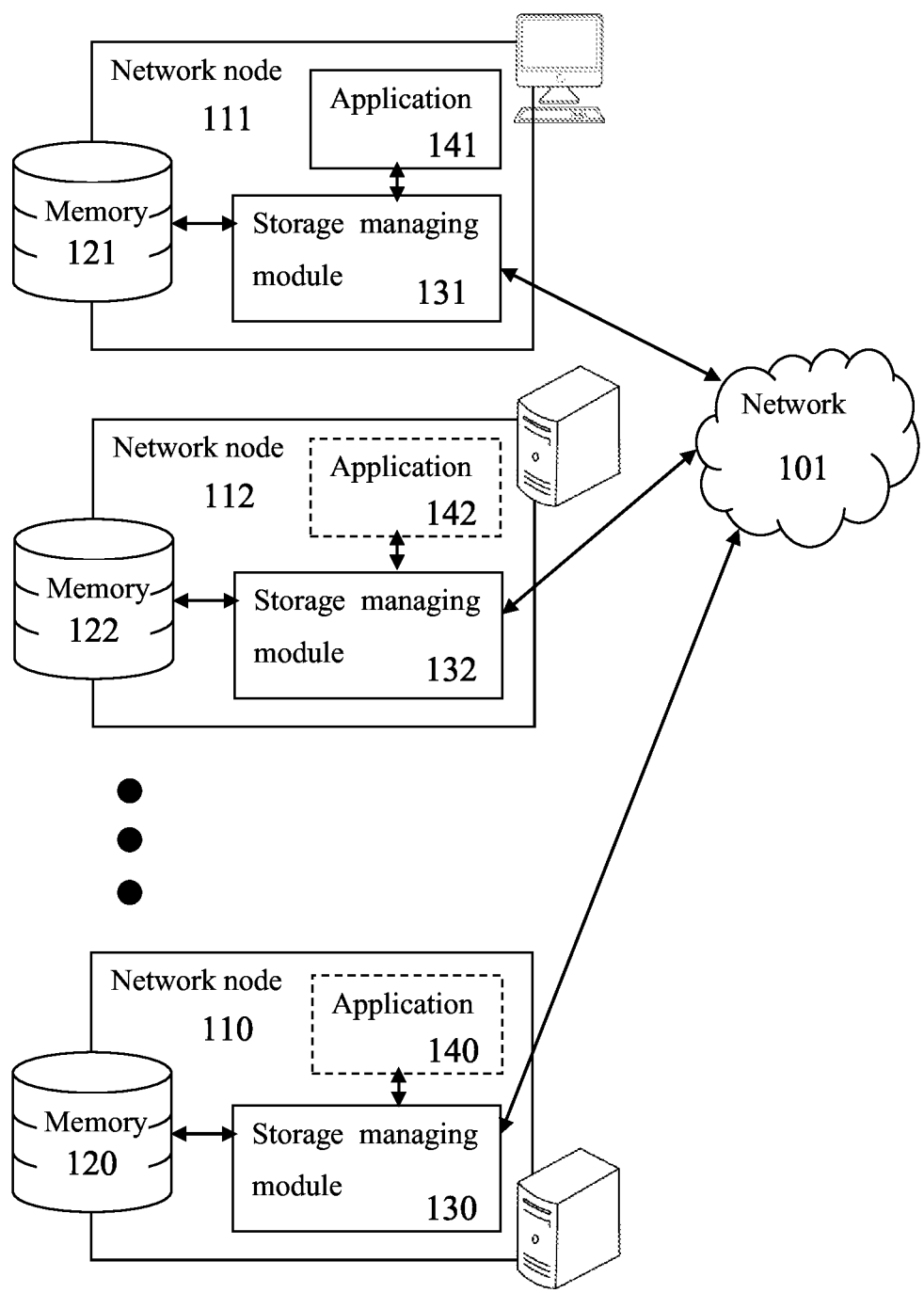
FIG. 1 is a schematic illustration of a distributed network storage system, such that includes memory records and managed by a shared file system, according to some embodiments of the present invention.

The present invention, in some embodiments thereof, relates to a shared file system and, more particularly, but not exclusively, to negotiating ownership of a memory record in a shared file system.

Storage media, typically thought of as non-volatile memory such as magnetic hard-disk drive (HDD) or Flash-based solid-state drive (SSD), offers affordable capacity, but at 1,000 to 100,000 times longer latency compared to volatile memory such as dynamic random-access memory (DRAM). Newly developed storage media, such as storage class memory (SCM) which is a form of persistent memory, promises DRAM-like ultra-low latency. When ultra-low latency storage is used, network latency is no longer a relatively insignificant delay like in traditional shared storage architectures. New shared storage architectures are required that minimizes network access and therefore overall network latency.

According to some embodiments of the present invention, there is provided a method of negotiating ownership of a memory record in a hierarchical shared file system having distributed segments of the file system to reduce network latency. The purpose of the method is to place new data and to relocate existing data so that the relocated data resides with the consuming application server, when possible.

The system includes multiple memory records that are stored in multiple network nodes. Each network node stores a segment of the file system that maps a subset of the memory records stored in that network node. Each memory record, such as an inode in Linux or entries in the master file table in Windows' new technology file system (NTFS), represents a directory or a file in the file system. Each memory record is owned (e.g. access managed and/or access controlled) by a single network node in the system, at a given time. The owning network node is the only entity in the system that is allowed to commit changes to its memory records.

When the method of negotiating memory record ownership between network nodes is applied, according to some embodiments of the present invention, a memory record, such as a data block, is requested from the owning network node by another network node. The owning network node receives the request and identifies the memory record by the file system segment stored in its memory. The owning network node then decides, using a placement algorithm, whether ownership of the memory record should be changed and the memory record should be relocated to the other network node or should not be changed. Based on this decision, the owning network node either transfers the ownership of the memory record and the memory record to the other network node or provides the other network node with remote access to the memory record.

The logic of the placement algorithm's decision is encouraging locality of memory records in the network node that uses them most, at this time period. The decision may also be based on current use of the memory record, network traffic load and/or frequency of previous relocations of the memory record.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a schematic illustration of a distributed network storage system, such as a cluster of application servers, that includes memory records and managed by a shared file system wherein segments of the file system are stored in a common network node with the records they map, according to some embodiments of the present invention.

The system includes multiple network nodes 110 such as application servers, each storing, in a memory 120, a subset of memory records from all the memory records stored in the system. Each one of network nodes 110 includes a file system segment of the file system, mapping the subset of memory records.

A memory record represents addressable data, such as a file, a directory a layout or a file segment such as a range of data blocks. A memory record may be of any offset and size (i.e. not warehouse records). The data block does not have to reside on memory storage media.

Each memory record is owned by one network node. Owning a memory record means, that the owning network node is storing its memory records and is the only entity in the system that is allowed to commit changes to its memory records. Committing changes may include modifying a memory record by changing the data (e.g. write system calls), cutting it short (e.g. truncate), adding information (e.g. append) and many other portable operating system interface (POSIX) variants. Similar commit operations are required in a directory for rename, touch, remove and other POSIX commands.

Each of network nodes 110 (such as network nodes 111 and 112) may be, for example, a physical computer such as a mainframe computer, a workstation, a conventional personal computer (PC), a server-class computer or multiple connected computers, and/or a virtual server.

Network nodes 110 are connected via one or more network(s) 101. Network 101 may include, for example, LAN, high performance computing network such as Infiniband and/or any other network. Optionally, network 110 is comprised of a hierarchy of different networks, such as multiple vLANs or a hybrid of LANs connected by WAN.

Memory 120 of each network node 110 may include, for example non-volatile memory (NVM), also known as persistent memory (PM), and/or solid-state drive (SSD), and/or magnetic hard-disk drive (HDD), and optionally optical disks or tape drives. These technologies can be internal or external devices or systems, including memory bricks accessible by the network node 110. Memory 120 may also be made by DRAM that is backed up with supercapacitor and Flash, or other hybrid technologies. In some use cases, such as ephemeral computing (e.g. most cloud services), memory 120 may even be comprised of volatile memory. Memory 120 may also include a partition in a disk drive, or even a file, a logical volume presented by a logical volume manager built on top of one or more disk drives, a persistent media, such as non-volatile memory (NVDIMM or NVRAM), a persistent array of storage blocks, and/or the like. Memory 120 may also be divided to a plurality of volumes, also referred to as partitions or block volumes. When 120 includes non-volatile memory, which is considerably faster than other storage media types, the reduced network latency achieved by the method is more significant.

The file system segment stored by each network node is typically implemented using tree structures. One tree supports lookups, adds and removes of inodes, while another is used to do the same for data blocks per file or directory. Some file systems may be implemented using other structures such as hash tables.

The information of memory record ownership may be implemented using a catalog architecture where each network node holds and mainly uses a subset of the global metadata, but there is for example a centralized catalog service 102 that provides the owning network node per memory record number; or using a distributed architecture such as shared (even if hierarchical) file systems, where all network nodes use the same tree root the file system segment, but hold different subsets of that tree.

Figure 2:
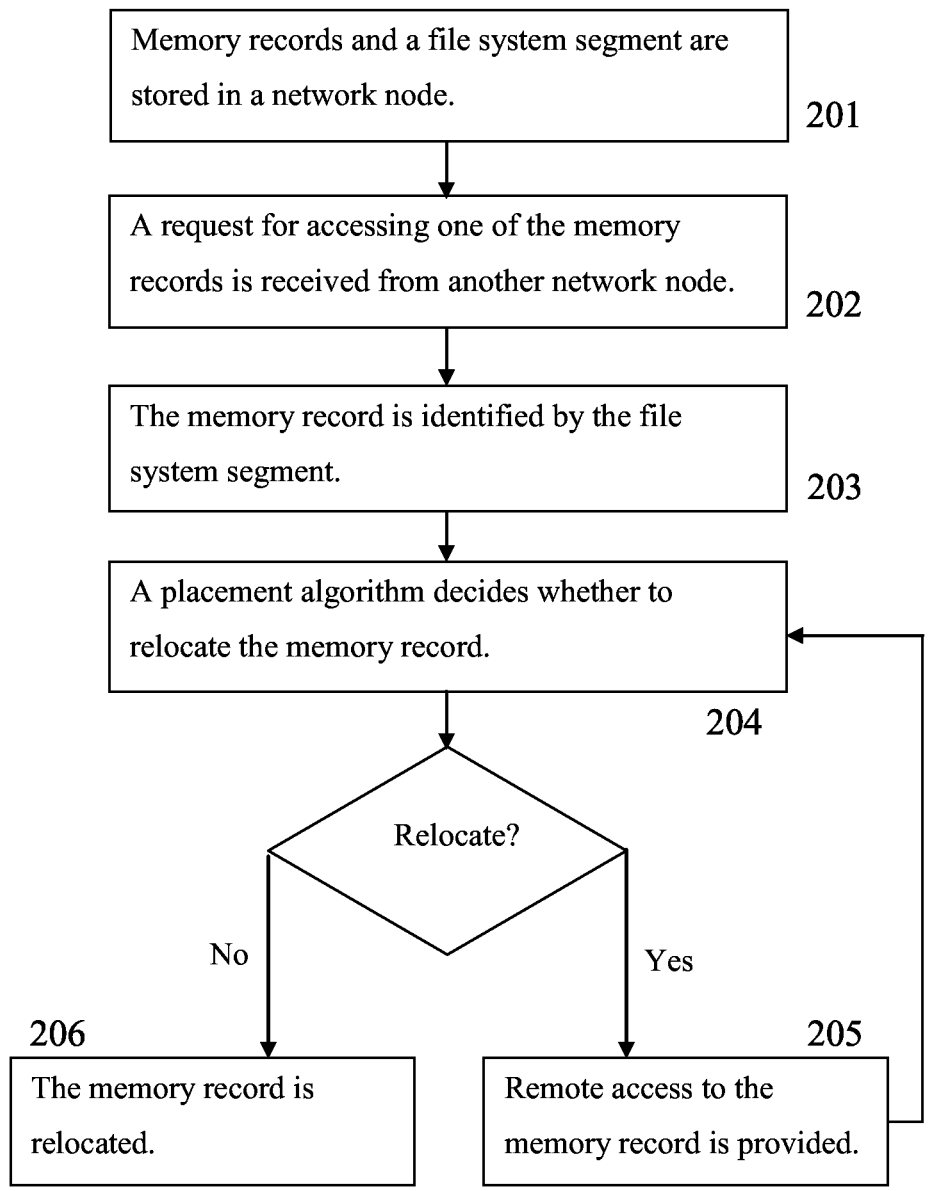
FIG. 2 is a flowchart schematically representing a method for negotiating memory record ownership between network nodes, according to some embodiments of the present invention.

Reference is now made to FIG. 2, which is a flowchart schematically representing a method for negotiating memory record ownership between network nodes, according to some embodiments of the present invention. For clarity, examples are explained using the well adopted POSIX application programming interface (API) and its open( ) system call, but the flow is similar for other file-access interfaces/libraries and object store API (e.g. put( ) & get( ).

First, as shown at 201, subset of the memory records and a file system segment are stored in a memory 122 of a network node 112.

Then, as shown at 202, a request from a network node 111 to access a memory record of the subset is received. The request may be triggered by a request for accessing the memory record received by a storage managing module 131 of network node 111 from an application 141 executed in network node 111, for example to read or write B bytes at offset O in a file.

Then, as shown at 203, the memory record is identified by the file system segment. The memory record is confirmed to actually be owned by network node 112 and stored in memory 122.

Then, as shown at 204, a placement algorithm decides whether to change ownership and to relocate the memory record, from the memory records subset to a memory records subset stored in a memory of network node 112. The logic of the placement algorithm's decision is encouraging locality of memory records in the network node that is expected to use it most.

The trigger for ownership change process is often because the user invoked an "open" function. However, ownership change process may also be invoked as a result of administrator hints (e.g. VM or container migration from one network node to another), user metadata operations (e.g. "ls" Linux shell command), load balancing (e.g. phasing a network node out or adding another one and rebalancing for performance, capacity or power consumption), and as a result of other cluster management actions.

Optionally, the placement algorithm decides that the ownership of a memory record should be changed when it is requested for write (e.g. an actual write system call, machine level stores following a memory map system call, or even an open system call with the O_WRONLY or O_RDWR flag) in by network node 111 and is unopened or opened in read-only mode (e.g. O_RDONLY flag) in all other network nodes. When the memory record is already open for write in another node, it will remain where it is. This way, there is always a single network node authorized to change a memory record and both local processes, the local application and the local file server continue to work in parallel until the local application closes the memory record, at which point a change of ownership can be reevaluated. Read accesses may be treated as ownership exchange triggers just like write accesses, but a better design would treat it differently because read accesses may be cached.

New memory records, created for instance as new files (e.g. open( ) with the O_CREAT flag), new file layouts (e.g. write append), or new directories (e.g. mkdir), are placed on the same network node which initiated them, providing that it has enough resources. Many applications run on a single network node and create their own directories, in which they place their files and directories. This encourages data and metadata locality within a directory.

Optionally, the placement algorithm decides that the ownership of a memory record should be changed, but has to be delayed.

Optionally, a change of ownership may be delayed due to too frequent ownership change requests for a particular memory record. This may be implemented, for example, by a timestamp that is created per memory record upon relocation and does not allow ownership changes for a predetermined time.

Optionally, a change of ownership may be delayed due to lack of vacant capacity on network node 111, for example when memory 121 is almost full.

Optionally, a change of ownership may be delayed due to network traffic considerations. This may be implemented, for example, by a network utilization threshold that if crossed, does not allow ownership changes for large memory records until network traffic is below the utilization threshold. Optionally, a network manager updates all nodes periodically or on demand on the approximated network utilization or congestion, for example below and/or above a threshold.

Optionally, the placement algorithm includes a process that decides to relocate rarely used data from loaded network nodes to third party shared storage, for example to network-attached storage (NAS) filers and/or to cloud storage. The process may be based on access frequency analysis or may be based on a relocation timestamp for the last relocation that is compared to the current time. Unlike relocating data to other network nodes in the system, this does not necessarily change the ownership of the file or layout. This may be done to reduce cost of storage, as the memory of the network nodes may be more expansive that the third party shared storage. In such cases an ownership exchange is easier, because only a reference (such as uniform resource locator (URL)/hypertext transfer protocol (HTTP) address for cloud storage or NAS mount point, file name and path) needs to be passed between network nodes.

Optionally, ownership of entire snapshots (read-only or read-write), or even sets of snapshots (e.g. all snapshots older than snapshot i) may be re-evaluated as a whole, and out-weight the per-file ownership process as described above. One example is the desire to back up the data on another geographical site and/or the desire to reduce cost, by relocating all data older then or belonging to a daily snapshot to a third party shared storage.

Optionally, when repeated read requests from multiple network nodes to a specific memory record (e.g. a golden image or library files) is identified, a local copy is made in each of the multiple network node to reduce load on network node 112. The copies may be partial or full, and may be deleted after the access session, or may be kept as mirrors of said memory record. The owning network node has the additional responsibility of invalidating the memory record or portions of it, for example via multicast or broadcast messages. Optionally, a copy of the memory record is made on a third party shared storage to reduce load on network node 112.

Optionally, the memory record may be mirrored on a third network node 110 in order to support high data availability. This may be leveraged in case of high network load on network node 112, because the requesting network node may connect to the third network node 110 for read only actions. This is especially beneficial if the requesting network node happens to be where the mirrored records exist (network node 110).

Compared to files, directories are more prawn to be accessed from multiple nodes. Also, they are not approached using the same systems calls (e.g. open/close/read/write/mmap). Still, the ownership of a directory may be changed as well, and also be protected from frequent changes. Optionally, the trigger to re-evaluate change of ownership of a directory is the creation, removal, or change of ownership of the files and subdirectories it holds. For example, a directory is to be owned by the network node owning the majority of sub files/directories. Optionally, a higher threshold for directory ownership change is applied to reduce the noise created from relocating information. Optionally, the frequency of ownership changes is also taken into account, in addition to the absolute number of owned files and subfolders. Optionally, change of ownership of a directory is requested by network node 111 when it has more than 50% of sub files and/or directories. Optionally, change of ownership of a directory is requested by network node 112 it has no sub files and/or directories.

In the distributed architecture of the information of memory record ownership, the ownership of indirection blocks should also change as required. The trigger to re-evaluate such a change may be, for example, the change of ownership of the indirection blocks or inodes it holds. The root itself may be treated in a similar manner. Optionally, because the Root is shared across the entire system by nature, it is never re-evaluated for non-failure related reasons.

When the placement algorithm decides not to relocate, as shown at 205, read and/or write access of the memory record is provided remotely, via network 101 to network node 112. I/O is performed over the network, to a process on network node 112 that acts as a network protocol server, for instance a network attached file system (NFS) protocol server, for that particular network node and memory record combination. When the memory record is stored at a third party shared storage, it is first relocated back to the owning network node 111, or may by access directly by network node 111 from the third party shared storage.

Optionally, post not approving relocation (205), the situation can be reevaluated (204) at a future time, for instance upon repeating access patterns to the same memory record, even without calling the open system call again.

When the placement algorithm decides that relocation is decided, as shown at 206, the memory record is relocated via network 101 to network node 112. When the memory record is stored at a third party shared storage, it is relocated directly from the third party shared storage to network node 112, for example by using the URL/HTTP address for cloud storage or the NAS mount point, file name and path.

Optionally, when memory record to be relocated as part of an ownership exchange is large and take time to relocate, it may be transferred in two concurrent approaches: one out-of-order and one that relates to specific demand pattern. One example is when a memory record is open, for example with the O_APPEND flag, relocating the beginning of the memory record is of lower priority and is done after relocating the end of the memory record. Optionally, the memory record may be partitioned into sub entities called layouts and allow different layouts to be owned by different network nodes. In the append example, all existing data could remain in the owning network node 112 and new data is placed on a new layout on the requesting network node 111. In another example, the layouts could be of set sizes (e.g. 1 GB).

Figure 3:
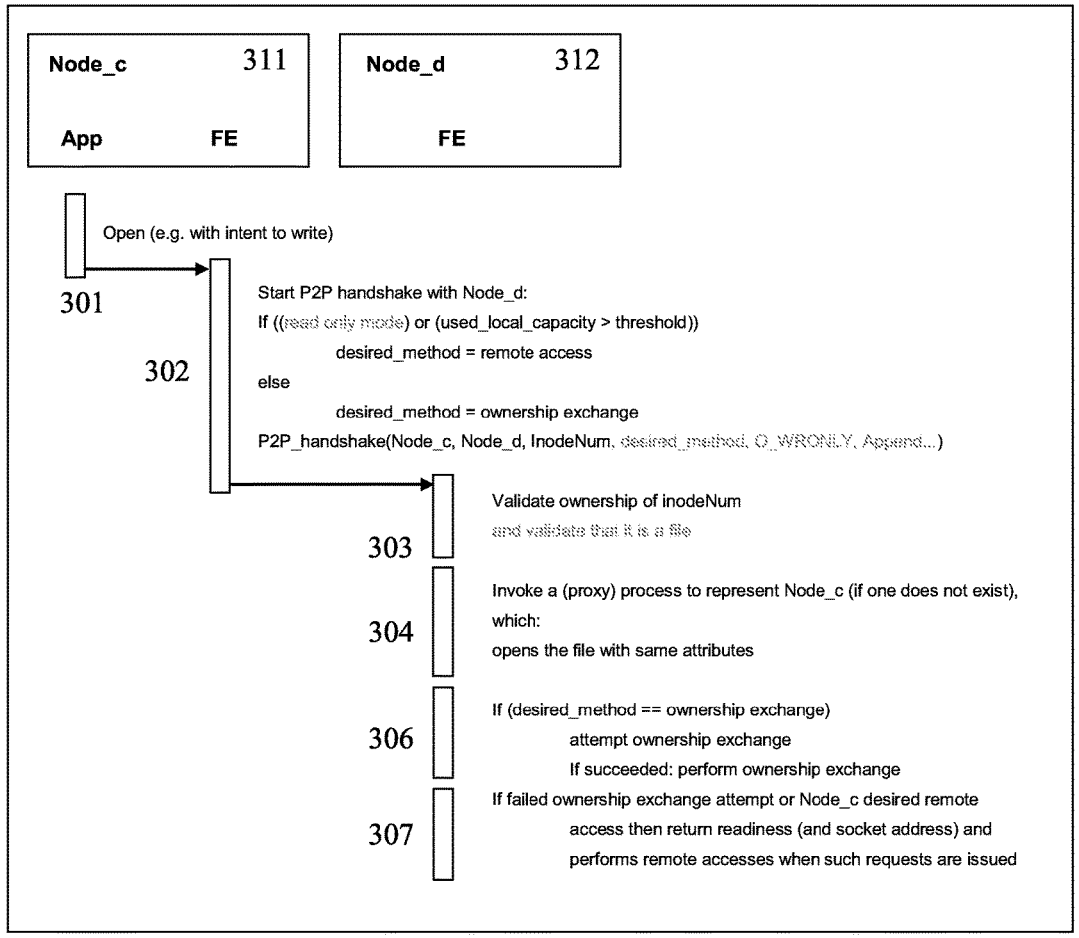
FIG. 3 is a sequence chart schematically representing an exemplary scenario of accessing a memory record in distributed network storage, according to some embodiments of the present invention.

Reference is now made to FIG. 3, which is a sequence chart schematically representing an exemplary scenario of accessing a memory record in distributed network storage, according to some embodiments of the present invention. The exemplary scenario is demonstrated using the POSIX semantics and Linux implementation (e.g. virtual file system (VFS) and its dentry cache).

In this example, a network node 'Node_c' 311 includes an application (App) and a front end (FE). The application requests to open a file (301) that is under the root. The open function call may include relevant flag argument(s) that can be passed to NodeID as part of the P2P handshake. For instance, reflecting the future access pattern: O_RDONLY, O_WRONLY, and O_APPEND.

The application requests to open file owned by another network node, 'Node_d' 312 (301). After Node_c 311 discovers the identity of Node_d 312 as the owner of the file (301), the FE starts P2P handshake with a FE of Node_d 312 (302). The FE of Node_c 311 optionally checks if the file is in read only mode and the used capacity of Node_c 311 is larger than a threshold. When one of these is true, the FE requests remote access to the file (311). Otherwise, it requests that the ownership of the file be transferred to Node_c 311 from Node_d 312.

The FE of Node_d 312 validates that Node_d 312 is indeed the owner of the file, and optionally also validates that what is requested is a file (303). It then Invoke a (proxy) process to represent Node_c 311 (if one does not exist), which opens the file with same attributes (304). Optionally, the open system call is only called when the desired method is remote access or for large files that cannot be moved in a very short period.

When the FE of Node_c 311 requested ownership exchange, the FE of Node_d 312 performs an attempt ownership exchange function that includes a placement algorithm (306). The placement algorithm decides to perform ownership exchange when no other processes have the file at open state or optionally at least that no other processes have the file at open with write mode (e.g. O_RDONLY flag). Optionally, the placement algorithm only decides to perform ownership exchange when also a timestamp of last ownership change of the file is more than a threshold older than the current time. Optionally, the placement algorithm only decides to perform ownership exchange when also the size of the file is less than a threshold or the approximated network utilization/congestion is below a threshold.

When the attempt ownership exchange function succeeds, an ownership exchange function is performed. The ownership exchange function locks the file, temporarily partitions the file into chunks (e.g. 10 MB chunks) and creates a representative bit map and optionally updates the catalog server that ownership change of inodeNum from Node_d to Node_c has begun. The function then Invoke two threads: a high priority thread to transfer on demand chunks (i.e. the last upon open with an append flag, or upon an access request to a particular offset) and a low priority thread to transfer chunks in order. Per chunk it optionally invalidates remote caches on other nodes when such exist and when successfully transferred, mark the proper bit in the bit map as such. Meanwhile, accesses (from proxy processes representing other network nodes) are optionally served for yet-to-be transferred chunks (or at least reads) and not served (such as redirected or retried) for already transferred chunks. When the transfer is complete, the function updates the central catalog that ownership change of inodeNum from Node_d to Node_c has completed, release all resources (such as bit map, threads, processes) and deletes the file on Node_d, while a hint of the new file location (Node_c) may be cached.

When the FE of Node_c 311 requested remote access or the attempt ownership exchange function fails, the FE of Node_d 312 returns readiness (and socket address) and performs remote accesses when such requests are issued. Subsequent access requests, when previously used remote access, may create similar handshakes to open file (307).

Read from file may be similar to write (i.e. cause file relocation), but may also rely on remote reads, local caching and timely invalidates when Node_d 312 changes data or relocates to new owner. Reading a directory may include also remote reads, local caching and timely invalidates when Node_d 312 changes data or relocates to new owner. Updating a directory may have many possible implementations such as remote procedure call.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for negotiating ownership of a memory record in a shared file system will be developed and the scope of the terms memory record and shared file system is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method, comprising:
   storing in a memory of a first network node a subset of a plurality of memory records and one of a plurality of file system segments of a shared file system executed by a plurality of network nodes; wherein the one file system segment executed by the first network node maps to said subset of the plurality of memory records, and wherein said subset of the plurality of memory records is owned by said first network node such that only said first network node is allowed to commit any changes to said subset of memory records stored at the memory of the first network node;
   receiving a request from a second network node to access a memory record of said memory records subset owned by said first network node;
   identifying said memory record by using said file system segment of the first network node;
   deciding, by a placement algorithm executed by the first network node that owns the memory record requested by the second network node, whether to relocate said memory record, from said memory records subset to a second subset of said plurality of memory records stored in a memory of said second network node based on making the memory record requested by the second network node local to the second network node and a frequency of previous relocations, if any, of said memory record;
   when a relocation is not decided, providing remote access to said memory record stored at the first network node via a network to said second network node; and
   when a relocation is decided, relocating said memory record via said network to the memory of the second network node such that said memory record becomes local to the second network node after relocation, for management by said second network node using a segment of the shared file system stored at the memory of the second network node.

2. The method of claim 1, wherein said deciding is done according to an open action for said memory record by said second network node.

3. The method of claim 1, wherein said deciding is done according to use of said memory record by other network nodes.

4. The method of claim 1, wherein said deciding is done according to traffic load on said network based on connections to said network node.

5. The method of claim 1, further comprising:
   monitoring previous relocations of said memory record between the plurality of network nodes in previous ownership negotiation processes;
   wherein said deciding is done according to said monitoring.

6. The method of claim 1, further comprising:
   when receiving requests from multiple network nodes for read only access to said memory record, creating cached copies of said memory record in storage units of said multiple network nodes to decrease network load.

7. The method of claim 6, further comprising:
   when said memory record is updated, invalidating said cached copies of said memory record.

8. The method of claim 1, wherein said relocation is delayed due to lack of vacant capacity on a memory of said second network node as indicated by said second network node.

9. The method of claim 1, wherein said relocation is delayed due to network traffic load on said network based on connections to said network node.

10. The method of claim 1, wherein said relocation is done by prioritizing relocation of data units of said memory record that are requested by said second network node.

11. The method of claim 1, further comprising:
    relocating a memory record of a directory containing said memory record.

12. A non-transitory machine-readable storage medium having stored thereon instructions for performing a method, comprising machine executable code which when executed by at least one machine, causes the machine to:
    store in a memory of a first network node a subset of a plurality of memory records and one of a plurality of file system segments of a shared file system executed by a plurality of network nodes; wherein the one file system segment executed by the first network node maps to said subset of the plurality of memory records, and wherein said subset of the plurality of memory records is owned by said first network node such that only said first network node is allowed to commit any changes to said subset of memory records stored at the memory of the first network node;
    receive a request from a second network node to access a memory record of said memory records subset owned by said first network node;
    identify said memory record by using said file system segment of the first network node;

decide, by a placement algorithm executed by the first network node that owns the memory record requested by the second network node, whether to relocate said memory record, from said memory records subset to a second subset of said plurality of memory records stored in a memory of said second network node based on making the memory record requested by the second network node local to the second network node and a frequency of previous relocations, if any, of said memory record;

when a relocation is not decided, provide remote access to said memory record stored at the first network node via a network to said second network node; and when a relocation is decided, relocate said memory record via said network to the memory of the second network node such that said memory record becomes local to the second network node after relocation, for management by said second network node using a segment of the shared file system stored at the memory of the second network node.

13. The non-transitory storage medium of claim 12, wherein decision to relocate is further based on an open action for said memory record by said second network node.

14. The non-transitory storage medium of claim 12, wherein decision to relocate is further based on use of said memory record by other network nodes.

15. The non-transitory storage medium of claim 12, wherein decision to relocate is further based on traffic load on said network based on connections to said second network node.

16. The non-transitory storage medium of claim 12, wherein relocation to the second network node is delayed due to lack of capacity at the memory of said second network node as indicated by said second network node.

17. A system, comprising:
a memory containing machine readable medium comprising machine executable code having stored thereon instructions; and a processor coupled to the memory to execute the machine executable code to:
store in a memory of a first network node a subset of a plurality of memory records and one of a plurality of file system segments of a shared file system executed by a plurality of network nodes; wherein the one file system segment executed by the first network node maps to said subset of the plurality of memory records, and wherein said subset of the plurality of memory records is owned by said first network node such that only said first network node is allowed to commit any changes to said subset of memory records stored at the memory of the first network node;

receive a request from a second network node to access a memory record of said memory records subset owned by said first network node;

identify said memory record by using said file system segment of the first network node;

decide, by a placement algorithm executed by the first network node that owns the memory record requested by the second network node, whether to relocate said memory record, from said memory records subset to a second subset of said plurality of memory records stored in a memory of said second network node, based on making the memory record requested by the second network node local to the second network node and a frequency of previous relocations, if any, of said memory record;

when a relocation is not decided, provide remote access to said memory record stored at the first network node via a network to said second network node; and when a relocation is decided, relocate said memory record via said network to the memory of the second network node such that said memory record becomes local to the second network node after relocation, for management by said second network node using a segment of the shared file system stored at the memory of the second network node.

18. The system of claim 17, wherein decision to relocate is further based on an open action for said memory record by said second network node.

19. The system of claim 17, wherein decision to relocate is further based on use of said memory record by other network nodes.

20. The system of claim 17, wherein decision to relocate is further based on traffic load on said network based on connections to said second network node.

\* \* \* \* \*